US008009446B2

(12) United States Patent
Chou et al.

(10) Patent No.: US 8,009,446 B2
(45) Date of Patent: Aug. 30, 2011

(54) RIPPLE VOLTAGE SUPPRESSION METHOD FOR DC/DC CONVERTER AND APPARATUS THEREOF

(75) Inventors: Hung-Liang Chou, Kaohsiung (TW); Jia-Min Shen, Kaohsiung (TW); Chin-Chang Wu, Kaohsiung (TW); Li-Hsiang Lai, Kaohsiung (TW); Lung-Chi Yang, Kaohsiung (TW); Ya-Tsung Feng, Kaohsiung (TW)

(73) Assignee: Ablerex Electronics Co., Ltd., Hsintien, Taipei (TW)

( * ) Notice: Subject to any disclaimer, the term of this patent is extended or adjusted under 35 U.S.C. 154(b) by 405 days.

(21) Appl. No.: 12/371,664

(22) Filed: Feb. 16, 2009

(65) Prior Publication Data

US 2010/0085784 A1    Apr. 8, 2010

(30) Foreign Application Priority Data

Oct. 3, 2008    (TW) .............................. 97138237 A

(51) Int. Cl.
*H02M 1/14* (2006.01)
*H02M 7/42* (2006.01)
(52) U.S. Cl. .......................................... 363/41; 363/97
(58) Field of Classification Search .................... 363/39, 363/40, 41, 42, 43, 95, 97, 98, 131, 132
See application file for complete search history.

(56) References Cited

U.S. PATENT DOCUMENTS

| | | | | |
|---|---|---|---|---|
| 4,934,822 A | * | 6/1990 | Higaki | 363/37 |
| 5,329,222 A | * | 7/1994 | Gyugyi et al. | 323/207 |
| 6,154,379 A | * | 11/2000 | Okita | 363/40 |
| 7,323,827 B2 | | 1/2008 | Nerone | |
| 7,355,866 B2 | | 4/2008 | Hsieh et al. | |

OTHER PUBLICATIONS

Wajiha Shireen and Hrishikesh Nene, Active Filtering of Input Ripple Current to Obtain Efficient and Reliable Power from Fuel Cell Sources, 2006 IEEE, 1-4244-0431-2.
Changrong Liu and Jih-Sheng Lai, Low Frequency Current Ripple Reduction Technique with Active Control in a Fuel Cell Power System with Inverter Load, IEEE Transactions on Power Electronics, vol. 22, No. 4, 2007 IEEE, Jul. 2007, 0885-8993.

* cited by examiner

*Primary Examiner* — Gary L Laxton
(74) *Attorney, Agent, or Firm* — Alan Kamrath; Kamrath & Associates PA

(57) ABSTRACT

A ripple voltage suppression apparatus includes a DC/DC converter and a control circuit. The DC/DC converter has a power electronic switch. The control circuit has a voltage detector detecting a DC output voltage of the DC/DC converter, a ripple voltage suppression circuit receiving the detected DC output voltage to generate an AC control signal for controlling an AC component of a duty ratio of the power electronic switch, an output voltage regulation circuit receiving the detected DC output voltage to generate a DC control signal for controlling an DC component of a duty ratio, an adder adding the AC and DC control signals to form a combined control signal, and a PWM circuit converting the combined control signal into a PWM signal to control the power electronic switch. Only the DC output voltage of the DC/DC converter has to be detected for the control circuit.

11 Claims, 6 Drawing Sheets

RIPPLE VOLTAGE SUPPRESSION METHOD FOR DC/DC CONVERTER AND APPARATUS THEREOF

BACKGROUND OF THE INVENTION

1. Field of the Invention

The present invention relates to a ripple voltage suppression method, and more particularly to a ripple voltage suppression method for DC/DC converter and apparatus thereof.

2. Description of the Related Art

Owing to binding the Kyoto Protocol for reducing greenhouse gas emissions and the increase cost of fossil fuel, renewable energies have the features of low pollution and low greenhouse gas emission, and it has become more and more important. Wind energy, solar energy and fuel cell are the important energy sources of renewable energies.

Now regarding to FIG. 1, a schematic structure illustrated a power conversion system connected between a DC input voltage source and an AC power distribution system or an AC load is shown. Generally, the DC input voltage source is a renewable power source: such as wind power generator, solar cell array or fuel cell system, wherein an electrical power generated by a wind power generator has to be initially converted into a DC power to match the voltage level of DC voltage of DC/AC inverter of the power conversion system. The reason for use of the power conversion system is illustrated as the following. The value of a DC input voltage generated by the wind power or solar power is variable and dependent on the conditions of climate and environment such as wind speed, temperature or illumination of sun, while that generated by fuel cells is also easily to vary due to the changes in load and flow amount of hydrogen and oxygen. Hence, the voltage level of DC input voltage generated by any one of the above-mentioned renewable energies is generally unstable, and the value thereof usually varies largely. Besides, the value of a DC input voltage outputted by the said renewable power source with small capacity is still too low for utilization or transmission. Consequently, a DC input voltage generated by the DC input voltage source has to be converted into an efficient and regular AC power through the power conversion system before being supplied to the AC power distribution system.

Referring to FIG. 1 again, the power conversion system includes a DC/DC converter 91, a DC/AC inverter 92 and a DC capacitor 93. The DC/DC converter 91, which is preferably selected from a boost converter for increasing the voltage level of the DC input voltage to another voltage level suitable for the DC voltage level of the DC/AC inverter 92, converts a DC power with the DC input voltage generated by the DC input voltage source into a regulated DC voltage. The DC/AC inverter 92 further converts the DC power with higher voltage level generated by the DC/DC converter 91 into an AC power for said AC power distribution system or AC load. The DC capacitor 93 electrically connects between the DC/DC converter 91 and the DC/AC inverter 92 in parallel and acts as an energy buffer. The DC/AC inverter 92 can generate a sinusoidal current in phase with that of the AC power distribution system and is injecting into the AC power distribution system. And thus the AC power transmitted to the AC power distribution system has unity power factor. Besides, the DC/AC inverter 92 can also generate a sinusoidal voltage for supplying the AC load.

Besides, more than the average real power, the AC power generated by the DC/AC inverter 92 also has an AC instantaneous power. In detail, when the AC power is transmitted to the AC power distribution system, the frequency of said AC instantaneous power is twice of a fundamental frequency of the AC power distribution system. And thus, the AC instantaneous power builds a ripple voltage on the DC capacitor 93, with the ripple voltage having a frequency equal to a double of the fundamental frequency of the AC power distribution system. On the other hand, when the AC power is transmitted to the AC load, the frequency of said AC instantaneous power is twice of a voltage frequency of the AC power. Hence, the AC instantaneous power builds another ripple voltage on the DC capacitor 93, with the ripple voltage having a frequency twice of the voltage frequency of the AC power distribution system.

As a result, if the DC/DC converter 91 only completes a control for supplying a regulated DC output voltage, the ripple voltage on the DC capacitor 93 will be transmitted to the DC input voltage generated by the DC input voltage source through the DC/DC converter 91. When the DC input voltage source is selected from a solar cell array or wind power generator, a ripple of the DC input voltage induced by the ripple voltage on the DC capacitor 93 causes a ripple voltage on the DC input voltage and thus unable to be fixed at an optimal operation point (maximum power point). Namely, a power generating efficiency of the DC input voltage source is lowered because of the existence of the ripple voltage. When the ripple voltage is superimposed on the DC input voltage source generated by a fuel cell system, this ripple voltage will raise the peak value of the DC input voltage. Said raised peak value of the DC input voltage results in needs of larger amount of fuel and capacity for a fuel cell system to maintain the same average power generated by the ripple-free fuel cell system, which absolutely increases the cost for building and operating the fuel cell system. Besides, the DC input voltage with the ripple voltage also shortens the life of the stacks of the fuel cell system.

Therefore, in order to suppress the ripple voltage caused by the DC/AC inverter 92, two conventional methods to improve have been proposed, which are illustrated as the following. The first one of them was published on IEEE Telecommunications Energy Conference, 2006, with a title of "Active Filtering of Input Ripple Current to Obtain Efficient and Reliable Power from Fuel Cell Sources". As shown in FIG. 2, through an active DC filter 94 parallelly connecting with the DC/AC inverter 92 at a DC side thereof, a current with a frequency of twice of the fundamental frequency generated by the active DC filter 94 is fed into the DC capacitor 93. Therefore, the ripple voltage caused by the AC instantaneous power and transmitted to the DC input voltage source through the DC capacitor 93 and DC/DC converter 91 is suppressed. However, a cost for the conventional power conversion system is thus raised for an installation of the active DC filter 94.

The second one of them was published on IEEE Transactions on Power Electronics, vol. 22, no. 4, July 2007, with a title of "Low Frequency Current Ripple Technique with Active Control in a Fuel Cell Power System with Inverter Load". Said conventional method is applied to a controller of the DC/DC converter 91, with a control method for the controller being a current-mode control instead of a voltage-mode control. Therefore, a response speed of the DC/DC converter 91 is raised, and thus the ripple voltage transmitted to the DC input voltage source is suppressed. Specifically, with a current detector, the current-mode control processed by the controller is executed by detecting an input current of the DC/DC converter 91 as a feedback signal. Hence, the input current of the DC/DC converter 91 is formed into a DC current by the controller, which prevents the ripple voltage generated by the DC/AC inverter 92 from entering the DC input voltage source. Besides, in order to outputting a regulated DC voltage, the DC/DC converter 91 further includes a voltage control circuit outside of the current-mode control for completing a function of voltage regulation. Therefore, the controller of the DC/DC converter 91 not only includes the voltage control circuit as an outer loop controller but also provides a current control circuit as an inner loop controller, so as to achieve the ripple voltage suppression as well as the voltage regulation. However, said double loop controller of the DC/DC converter 91 results in a complex circuit structure and an extra cost for the additional current detector. Accordingly, there is a need for redesigning the conventional ripple voltage suppression method for DC/DC converter and the apparatuses for implementation thereof.

SUMMARY OF THE INVENTION

The primary objective of this invention is to provide a ripple voltage suppression method for a DC/DC converter and an apparatus for implementation thereof to suppress a ripple voltage that could be transmitted from an output side of a DC/DC converter to an input side thereof.

The secondary objective of this invention is to provide the ripple voltage suppression method for a DC/DC converter and the apparatus for implementation thereof to simplify a control circuit of the DC/DC converter.

Another objective of this invention is to provide the ripple voltage suppression method for DC/DC converter and the apparatus for implementation thereof to lower the cost of the control circuit.

In accordance with an aspect of the present invention, the ripple voltage suppression apparatus includes a DC/DC converter and a control circuit. The DC/DC converter has a power electronic switch, and the control circuit has a voltage detector for detecting an output voltage of the DC/DC converter, a ripple voltage suppression circuit receiving the detected output voltage to generate an AC control signal for controlling an AC component of a duty ratio of the power electronic switch, an output voltage regulation circuit receiving the detected output voltage to generate a DC control signal for controlling a DC component of the duty ratio, an adder adding the AC and DC control signals to form a united control signal, and a PWM circuit converting the united control signal into a PWM signal to control the power electronic switch. Furthermore, only the output voltage of the DC/DC converter has to be detected for the control circuit.

In accordance with another aspect of the present invention, the ripple voltage suppression method for controlling a power electronic switch of a DC/DC converter by a control circuit includes: detecting an output voltage of the DC/DC converter by a voltage detector; sending the output voltage of the DC/DC converter to the control circuit; generating an AC control signal and a DC control signal respectively by a ripple voltage suppression circuit and an output voltage regulation circuit of the control circuit, with the AC control signal being used to control an AC component of a duty ratio of the power electronic switch and the DC control signal being used to control a DC component of the duty ratio of the power electronic switch; adding the AC control signal and the DC control signal to form a united control signal and then inputting the united control signal into a PWM circuit to obtain a PWM signal; and transmitting the PWM signal to the power electronic switch for controlling the power electronic switch.

According to the above presented ripple voltage suppression method for DC/DC converter and the apparatus for implementation thereof, the following effects are achieved. First, when the presented method and apparatus are applied to a renewable power generating system that is selected form a wind power generator or a solar cell array, an amount of the electrical power generated by the renewable power generating system and the utility efficiency thereof are raised; and when the presented method and apparatus are applied to a renewable power generating system that is selected form a fuel cell system, not only an amount of the electrical power generated by the renewable power generating system and an utility efficiency thereof are raised, but also a life of the fuel cell system is raised and the cost for operation of the fuel cell system is lowered. Second, what has to be detected for the DC/DC converter to effectively suppress a ripple voltage that could be transmitted to the input side of the DC/DC converter is an output voltage of the DC/DC converter merely, so that an installation of an extra current detector therefore is omitted and the cost can be reduced.

Further scope of the applicability of the present invention will become apparent from the detailed description given hereinafter in connection with drawings. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinafter, and the accompanying drawings that are given by way of illustration only are not limitations of the present invention, wherein.

Figure 1:
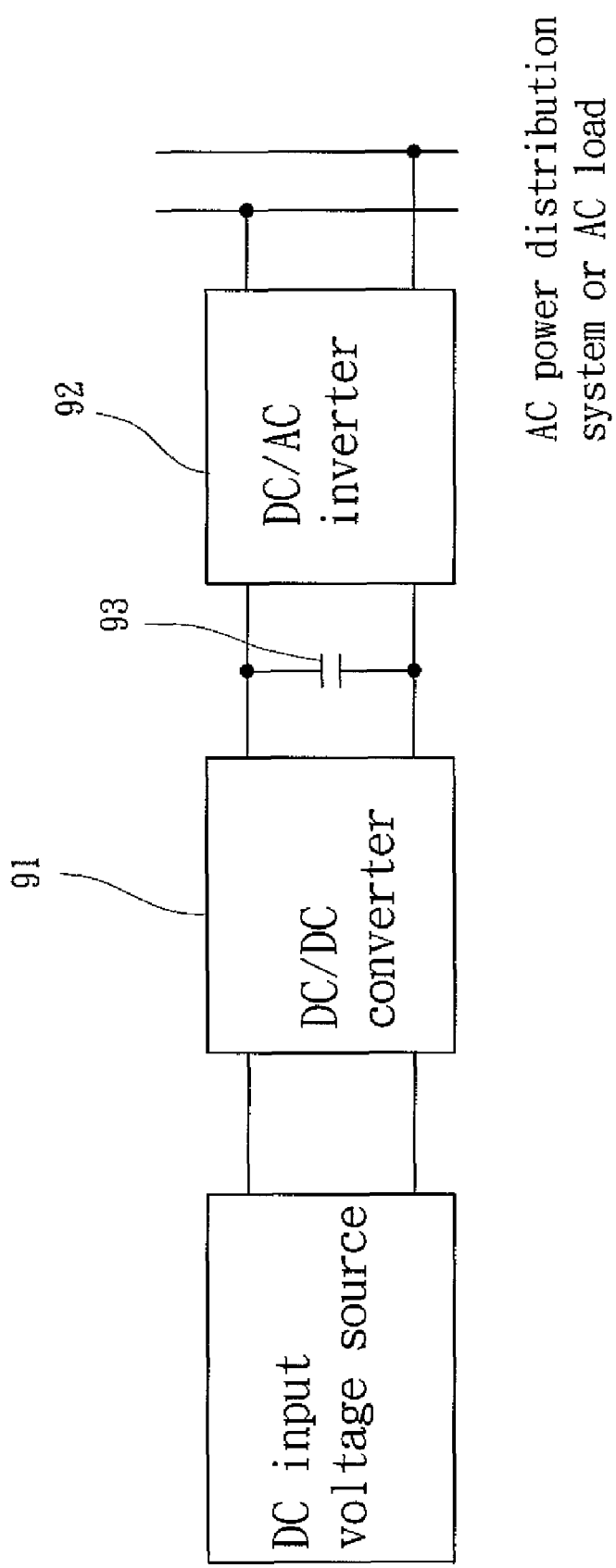
FIG. 1 is a schematic circuit of a conventional power conversion system.
Figure 2:
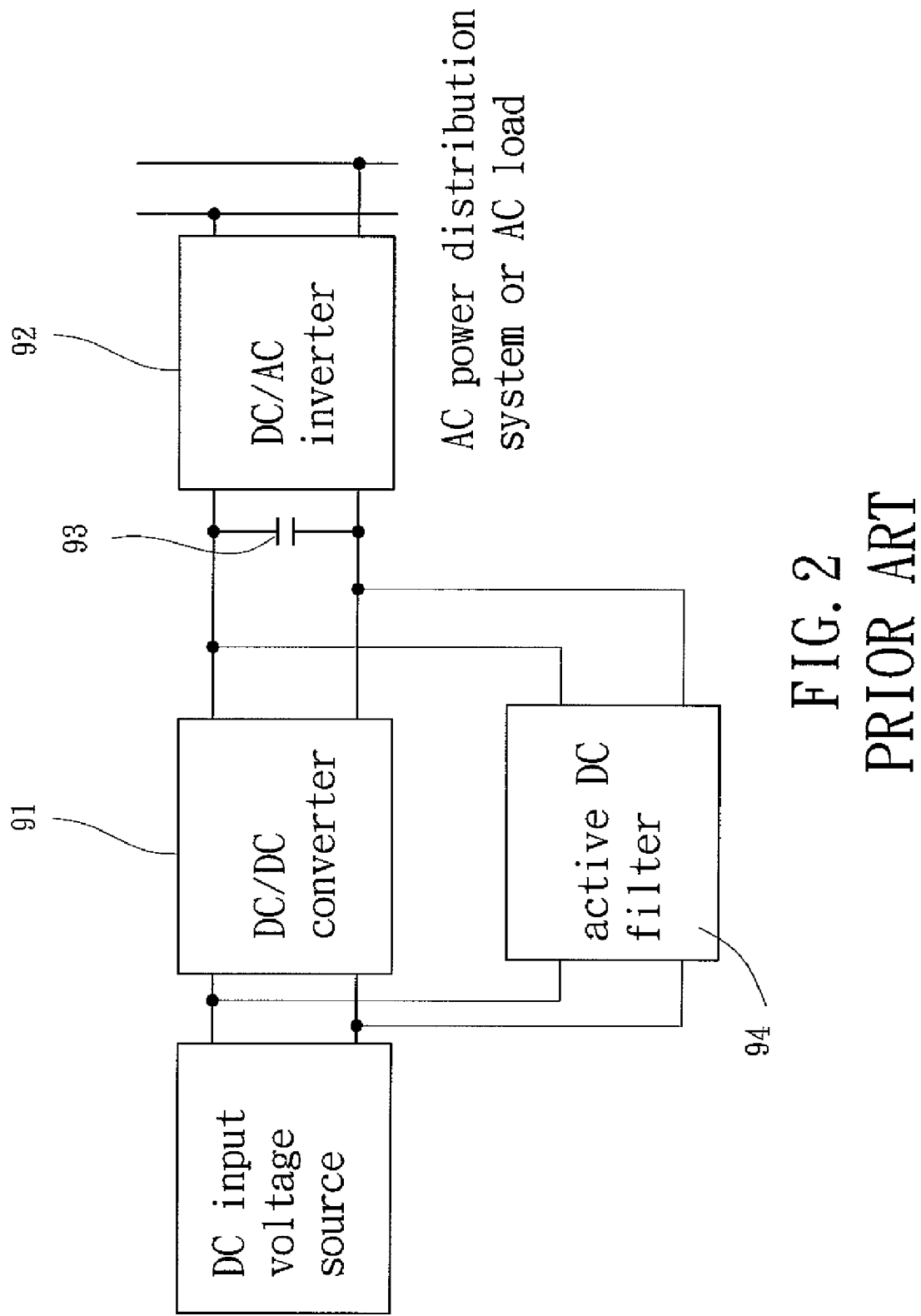
FIG. 2 is a schematic circuit of a conventional ripple voltage suppression apparatus for said power conversion system.

In the various figures of the drawings, the same numerals designate the same or similar parts. Furthermore, when the terms "first", "second", "third", "one", "the other" and similar terms are used hereinafter, it should be understood that these terms are reference only to the structure shown in the drawings as it would appear to a person viewing the drawings and are utilized only to facilitate describing the invention.

DETAILED DESCRIPTION OF THE INVENTION

Figure 3:
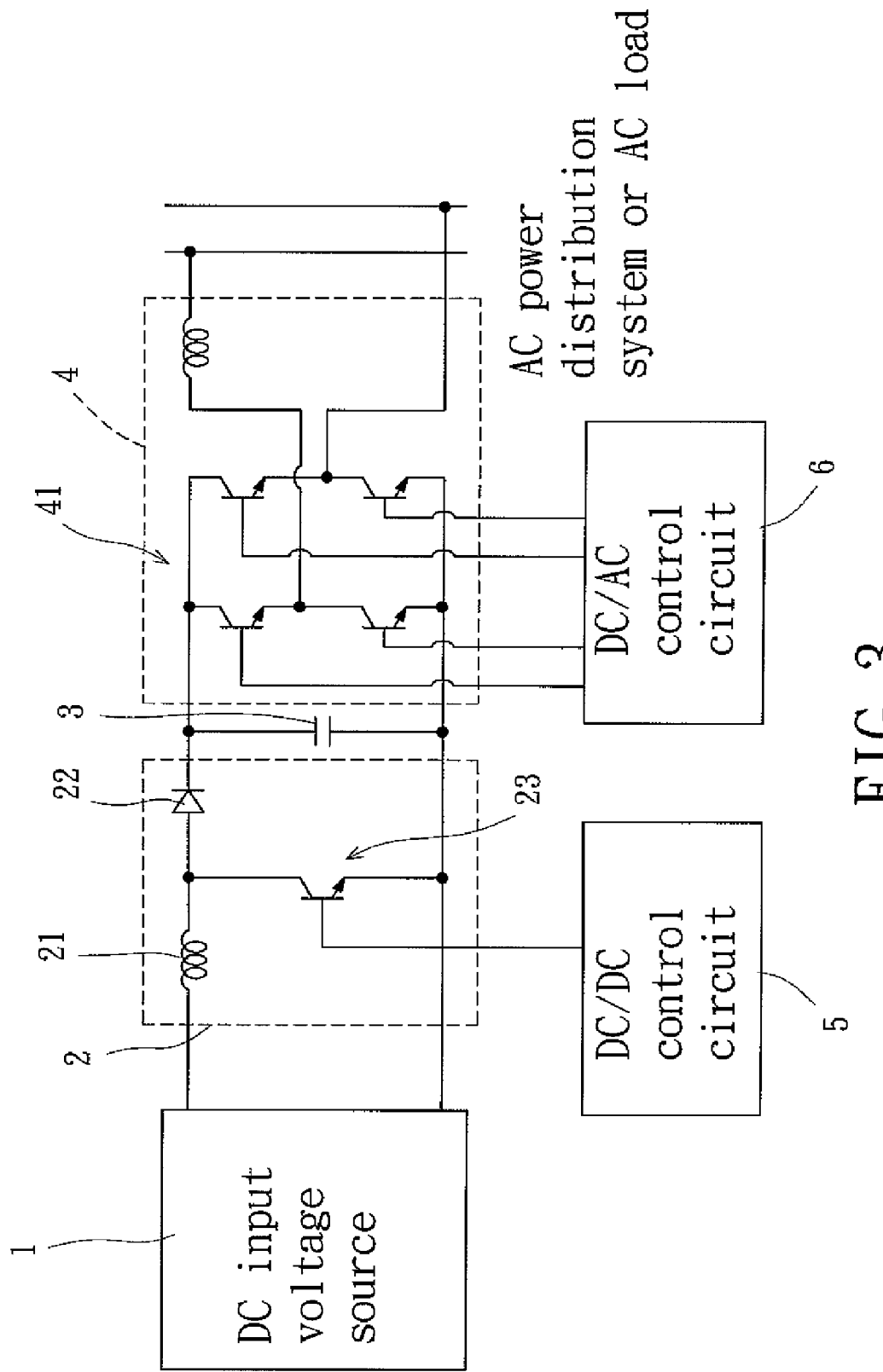
FIG. 3 is a schematic circuit of a renewable power generating system applying a ripple voltage suppression method for DC/DC converter and the apparatus for implementation thereof in accordance with a preferred embodiment of the present invention.

Referring now to FIG. 3, a preferred embodiment of the present invention of a ripple voltage suppression method for DC/DC converter is preferably applied to a renewable power generating system including a DC input voltage source 1 and a power conversion system including a DC/DC converter 2, a DC capacitor 3 acting as an energy buffer and a DC/AC inverter 4, with the DC input voltage source 1 connecting to an AC power distribution system or an AC load through the DC/DC converter 2, DC capacitor 3 and DC/AC inverter 4 in sequence. Thereby, the electrical power generated by the DC input voltage source 1 can be converted to an AC power and supplied to the AC power distribution system or AC load. Specifically, the DC input voltage source 1 is preferably selected from a wind power generator, a solar cell array or a fuel cell system, with an electrical power generated by a wind power generator being initially converted into a DC power before inputted into the power conversion system. Besides, no matter which one of them is selected as the DC input voltage source 1, an output of the DC input voltage source 1 is usually a variable DC power with a wide voltage range. The DC/DC converter 2 is preferably a boost converter for converting a DC voltage of the variable DC power with a lower voltage level into a DC output voltage with a higher voltage level. The DC capacitor 3 acts as energy buffer between the DC/DC converter 2 and DC/AC inverter 4 and connects with an output side of the DC/DC converter 2 and an input side of the DC/AC inverter 4 in parallel. The DC/AC inverter 4 converts a DC power of the DC output voltage generated by the DC/DC converter 2 into an AC power with a sinusoidal current having a phase equal to that of a voltage of the AC power distribution system or with a sinusoidal voltage for the AC load. The DC/DC converter 2 can be selected from any electrical circuit working as a DC/DC converter while the DC/AC inverter 4 can be selected from any electrical circuit working as a DC/AC inverter.

Please still refer to FIG. 3. The DC/DC converter 2 of the preferred embodiment of the present invention includes an inductor 21, a diode 22 and a power electronic switch 23. The inductor 21 and diode 22 are connected between an output terminal at the output side of the DC/DC converter 2 and an input terminal at an input side thereof with said inductor 21 and diode 22 electrically connecting with each other in series. The power electronic switch 23 has two end points, with one of them connecting with a joint point between the inductor 21 and diode 22 and the other connecting with another output terminal at the output side and another input terminal at the input side of the DC/DC converter 2. Besides, regarding to the DC/DC converter 2, the two input terminals connect to the DC input voltage source 1 and the two output terminals connect to the DC capacitor 3 and DC/AC inverter 4. Further, in accordance with the circuit structure of the DC/DC converter 2, a transfer function between output and input voltages of the DC/DC converter 2 in continuous current mode is illustrated as:

$$\frac{v_{dc}}{v_{in}} = \frac{1}{1-D} \tag{1}$$

wherein the "$v_{in}$" denotes the DC input voltage of the DC/DC converter 2, the "$v_{dc}$" denotes the output DC voltage of the DC/DC converter 2, and the "D" denotes a duty ratio of the power electronic switch 23. And thus, regarding to the transfer function (1), the DC input voltage of the DC/DC converter 2 can be identified as:

$$v_{in} = v_{dc}(1-D). \tag{2}$$

Furthermore, by small signal analysis, the DC input voltage $v_{in}$, DC output voltage $v_{dc}$ and duty ratio D can be separately presented as:

$$v_{in} = \bar{v}_{in} + \tilde{v}_{in} \tag{3}$$

$$v_{dc} = \bar{v}_{dc} + \tilde{v}_{dc} \tag{4}$$

$$D = \bar{D} + \tilde{D} \tag{5}$$

And the $\bar{v}_{in}$ is a DC component of the DC input voltage $v_{in}$; the $\tilde{v}_{in}$ is an AC component of the DC input voltage $v_{in}$; the $\bar{v}_{dc}$ is a DC component of the DC output voltage $v_{dc}$; the $\tilde{v}_{dc}$ is an AC component of the DC output voltage $v_{dc}$; the $\bar{D}$ is a DC component of the duty ratio D; and the $\tilde{D}$ is an AC component of the duty ratio D. Hence, by substitution of results in equations (3), (4), and (5) for the DC input voltage $v_{in}$, DC output voltage $v_{dc}$ and duty ratio D in equation (2), an equation shown as the following is obtained:

$$\bar{v}_{in} + \tilde{v}_{in} = [1-(\bar{D}+\tilde{D})](\bar{v}_{dc}+\tilde{v}_{dc}) = (1-\bar{D})\bar{v}_{dc} + (1-\bar{D})\tilde{v}_{dc} - \tilde{D}v_{dc}. \tag{6}$$

In addition, because the DC component $\bar{v}_{in}$ of the DC input voltage $v_{in}$ can be presented as $$\bar{v}_{in} = (1-\bar{D})\bar{v}_{dc} \tag{7}$$

in steady state, the equation (6) can be reformed and thus a ripple voltage occurring at the input side of the DC/DC converter 2, that is, the AC component $\tilde{v}_{in}$ of the DC input voltage $v_{in}$ is presented as the following:

$$\tilde{v}_{in} = (1-\bar{D})\tilde{v}_{dc} - \tilde{D}v_{dc}. \tag{8}$$

Accordingly, in order to suppress the ripple voltage at the input side of the DC/DC converter 2, the AC component $\tilde{D}$ of the duty ratio D has to be set as the following for the AC component $\tilde{v}_{in}$ of the DC input voltage $v_{in}$ to be zero:

$$\tilde{D} = (1-\bar{D})\frac{\tilde{v}_{dc}}{v_{dc}}. \tag{9}$$

In sum, from the relationship expressed by the equation (7), the output voltage of the DC/DC converter 2 can be fixed on a steady value under the providing of variable DC power generated by the DC input voltage source 1 through a control over the DC component $\bar{D}$ of the duty ratio D. Besides, from the relationship expressed by the equation (9), the ripple voltage, namely the AC component $\tilde{v}_{in}$ of the DC input voltage $v_{in}$, can be suppressed to zero by controlling the AC component $\tilde{D}$ of the duty ratio D to satisfy the result in equation (9). As a result, the ripple voltage that could be transmitted from the output side of the DC/DC converter 2 to the input side thereof and raise an effect affecting the operation of the DC input voltage source 1 is avoided.

Figure 4:
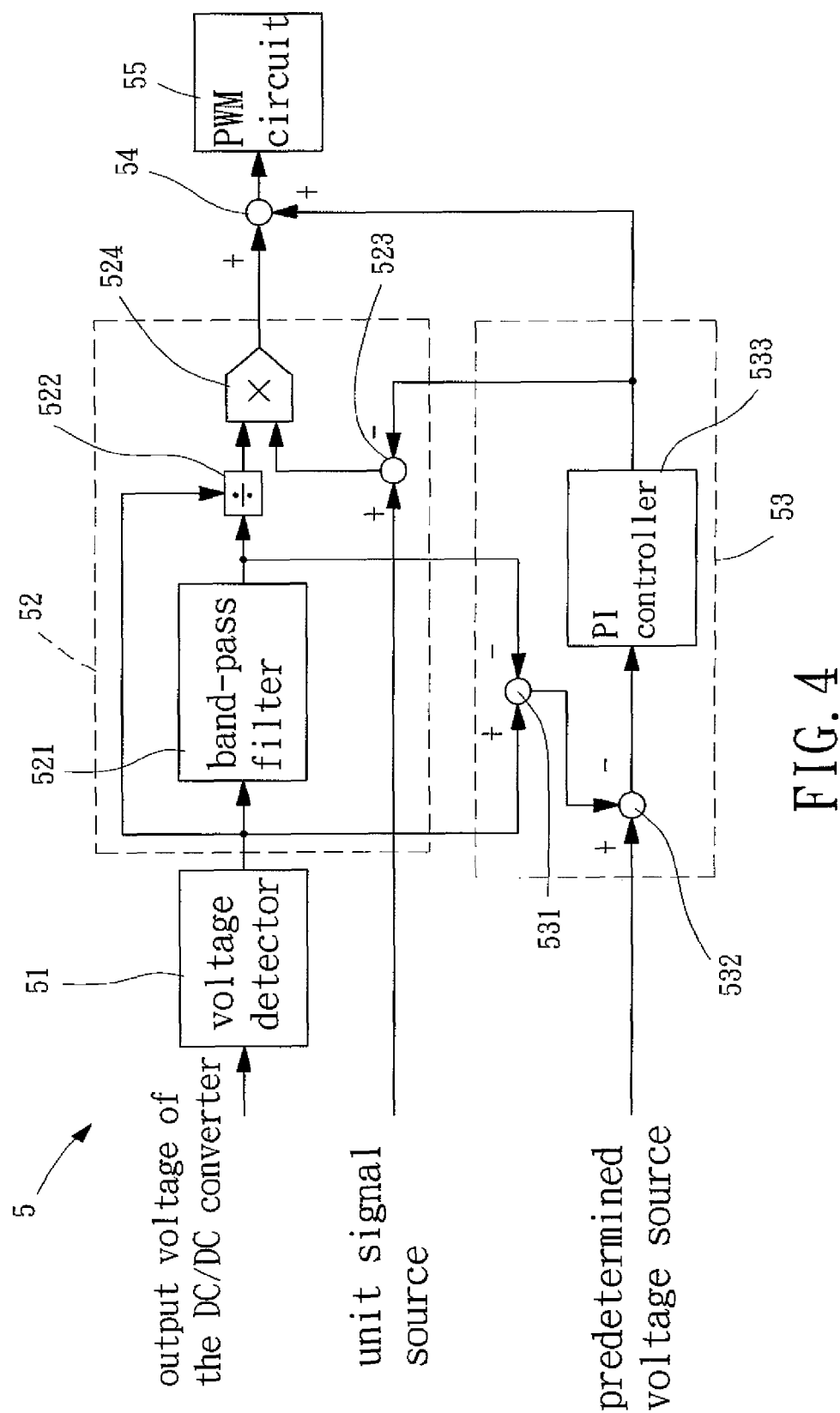
FIG. 4 is a control block diagram of a DC/DC control circuit in accordance with the preferred embodiment of the present invention.

Turning to FIGS. 3 and 4 now, a control signal for the power electronic switch 23 of the DC/DC converter 2 is generated by a DC/DC control circuit 5 to achieve the purpose of suppression the ripple voltage. As shown in FIG. 4, the DC/DC control circuit 5 includes a voltage detector 51 detecting the DC output voltage $v_{dc}$ of the DC/DC converter 2, a ripple voltage suppression circuit 52 generating an AC control signal to control the AC component $\tilde{D}$ of the duty ratio D for preventing the DC input voltage source 1 from the ripple voltage, an output voltage regulation circuit 53 generating a DC control signal to control the DC component $\bar{D}$ of the duty ratio D for the DC/DC converter 2 to provide the DC/AC inverter 4 with a DC voltage having a stable average value, an adder 54 adding the AC and DC control signals to form a united control signal, and a pulse-width-modulation (PWM) circuit 55 converting the united control signal into a PWM signal to control the power electronic switch 23.

In detail, the ripple voltage suppression circuit 52 includes a band-pass filter 521, a divider 522, a first subtractor 523, and a multiplier 524. An input of the band-pass filter 521 connects with the output of the voltage detector 51 for the band-pass filter 521 to obtain and output the AC component $\tilde{v}_{dc}$ of the DC output voltage $v_{dc}$ while two inputs of the divider 522 separately link to outputs of the voltage detector 51 and band-pass filter 521 for the divider 522 to divide the AC component $\tilde{v}_{dc}$ of the DC output voltage $v_{dc}$ by the DC output voltage $v_{dc}$. The first subtractor 523 has two inputs for a unit signal source and an output of the output voltage regulation circuit 53 to connect, so as to subtract the DC control signal from a DC unit signal. And the multiplier 524 provides two inputs respectively connecting with outputs of the divider 522 and first subtractor 523 for multiplying said two outputs of the divider 522 and first subtractor 523 and thereby obtaining the AC control signal. On the other hand, the output voltage regulation circuit 53 includes a second subtractor 531, a third subtractor 532, and a proportional-integral (PI) controller 533. The second subtractor 531 has two inputs separately linking to the outputs of the voltage detector 51 and band-pass filter 521 for subtracting the AC component $\tilde{v}_{dc}$ of the DC output voltage $v_{dc}$ from the DC output voltage $v_{dc}$ and outputting the DC component $\bar{v}_{dc}$ of the DC output voltage $v_{dc}$ by an output thereof. The third subtractor 532 has two inputs, and one of them connects with the output of the second subtractor 531 while the other is for a predetermined voltage generated by a predetermined voltage source to be inputted into the third subtractor 532, with the predetermined voltage being a desired voltage for the DC component $\bar{v}_{dc}$ of the DC output voltage $v_{dc}$ to track, and the third subtractor 532 can thereby generate an error signal. The error signal is then transmitted to the PI controller 533 for the PI controller 533 to generate and output the DC control signal. Specifically, in practical application, the DC component $\bar{v}_{dc}$ of the DC output voltage $v_{dc}$ is equivalent to an average DC output voltage of the DC/DC converter 2.

According to the above structure of the DC/DC control circuit 5, what has to be detected for the DC/DC converter 2 to effectively suppress the ripple voltage that could be transmitted to the DC input voltage source 1 through the DC/DC converter 2 is the DC output voltage $v_{dc}$ of the DC/DC converter 2 merely. In comparison with the conventional DC/DC converter including a voltage feedback control circuit as an outer-loop controller and a current feedback control circuit as an inner-loop controller, the DC/DC control circuit 5 of the present invention not only has a simpler structure but also save a current detector that is necessary for said conventional DC/DC converter, so as to be manufactured with lower cost.

Now referring to FIG. 3 again, the DC/AC inverter 4 includes a power electronic switch set 41 and a DC/AC control circuit 6. The power electronic switch set 41 has a plurality of power electronic switches to form a full bridge structure as shown in FIG. 3 or a half bridge structure, with two DC terminals of the power electronic switch set 41 connecting with the two output terminals of the DC/DC converter 2 respectively and two AC terminals of that connecting to the AC power distribution system or AC load. The DC/AC control circuit 6 controls the DC/AC inverter 4 to convert the DC power generated by the DC/DC converter 2 into a quality AC power for said AC power distribution system or AC load.

Figure 5:
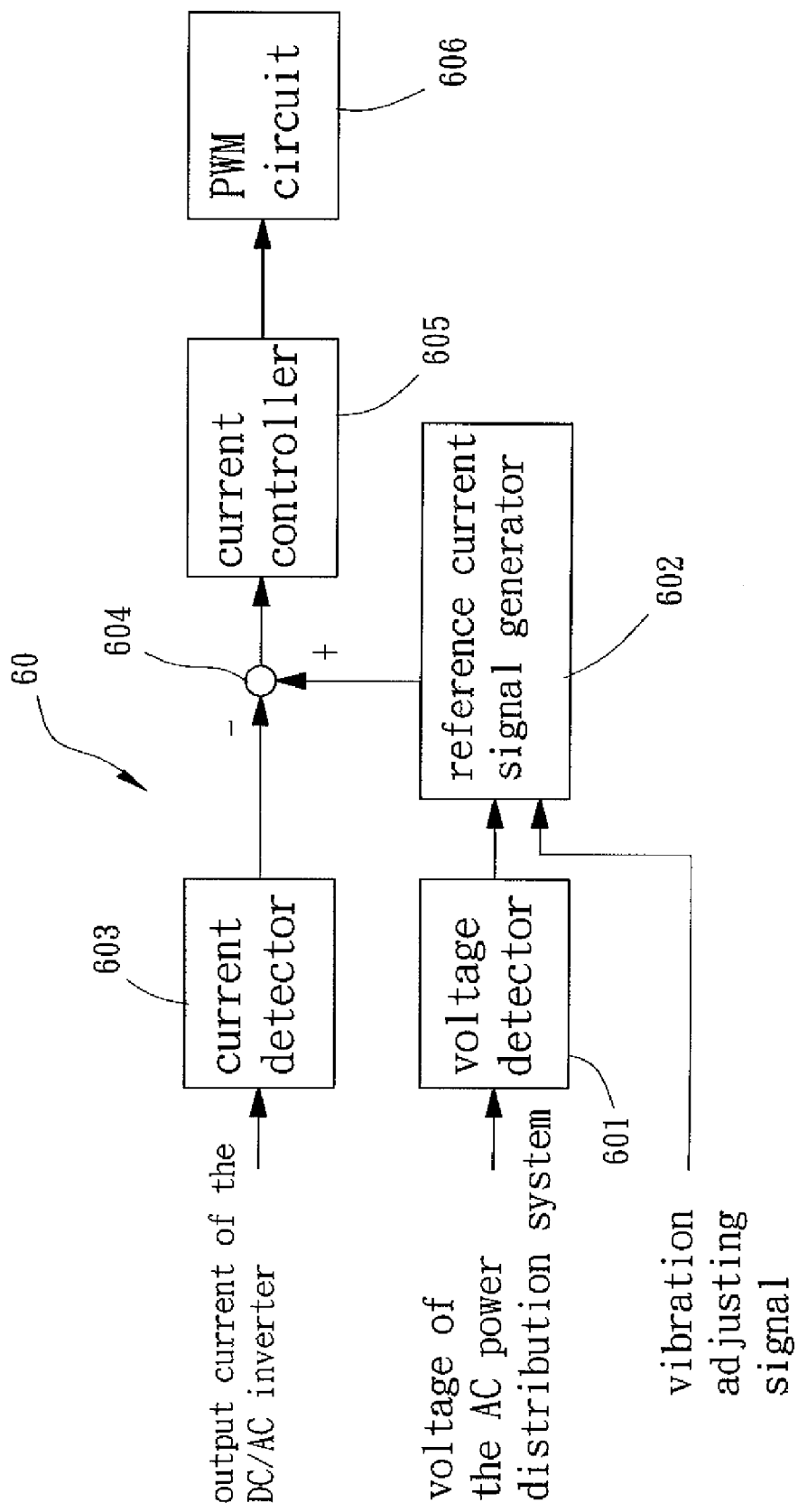
FIG. 5 is a control block diagram of a DC/AC control circuit in accordance with the preferred embodiment of the present invention.
Figure 6:
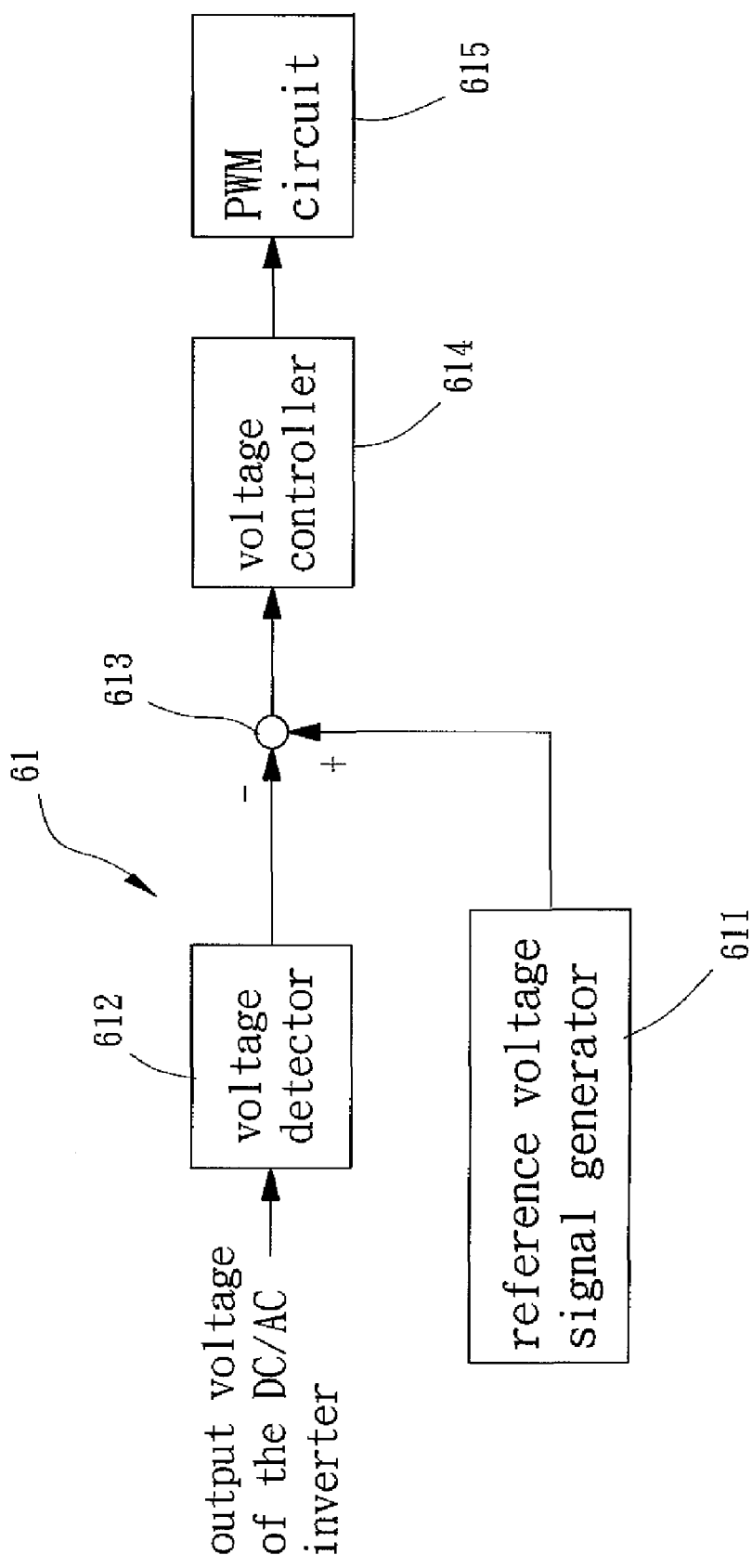
FIG. 6 is a control block diagram of another DC/AC control circuit in accordance with the preferred embodiment of the present invention.

Please further refer to FIGS. 5 and 6. Two examples of the DC/AC control circuit 6 denoted as 60 and 61 and respectively for applications to the AC power distribution system and AC load are shown. Specifically, when the DC/AC inverter 4 connects with the AC power distribution system, said DC/AC control circuit 60 illustrated in FIG. 5 is used. The DC/AC control circuit 60 detects the voltage of the AC power distribution system by a voltage detector 601, with a reference current signal generator 602 receiving an amplitude signal and an output signal of the voltage detector 601. The reference current signal generator 602 generates a reference current signal that is a sinusoidal signal having the same phase of the voltage of the AC power distribution system. A current detector 603 detects the AC current outputted by the DC/AC inverter 4. A subtractor 604 subtracts an output signal of the current detector 603 from the reference current signal to obtain an error signal, with the error signal being sent to a current controller 605. A PWM circuit 606 receives an output signal of the current controller 605 and generates a set of PWM signals for controlling the power electronic switches of the power electronic switch set 41. Besides, when the DC input voltage source 1 is selected from a wind power generator or a solar cell array, the amplitude signal inputted into the reference current signal generator 602 is preferably produced by a maximum power point tracking (MPPT) circuit, such that the DC input voltage source 1 can be operated at a maximum power point. However, when the DC input voltage source 1 is selected from a fuel cell system, said amplitude signal is preferably produced by a fuel supplying control circuit, such that the DC input voltage source 1 can be operated at the optimal operation point according to a fuel amount of the fuel cell system.

On the contrary, when the DC/AC inverter 4 connects with the AC load, said DC/AC control circuit 61 illustrated in FIG. 6 is used. The DC/AC control circuit 61 calculates a reference voltage signal by a reference voltage signal generator 611, and detects an AC voltage outputted by the DC/AC inverter 4 by a voltage detector 612. The reference voltage signal has a sinusoidal waveform. A subtractor 613 subtracts an output signal of the voltage detector 612 from the reference voltage signal to obtain an error signal, with the error signal being sent to a voltage controller 614. A PWM circuit 615 receives an output signal of the voltage controller 614 and generates a set of PWM signals for controlling the power electronic switches of the power electronic switch set 41. Thus, said quality AC power for the AC load is produced.

In comparison with the conventional ripple voltage suppression method that raises a cost for the installation of the active DC filter 94, increases complexity of the controller of the DC/DC converter 91 or needs an extra cost for the additional current detector, the DC/DC control circuit 5 can obtain the PWM signal to control the power electronic switch 23 through detecting only the DC output voltage $v_{dc}$ of the DC/DC converter 2 by the voltage detector 51 and calculating the PWM signal by the ripple voltage suppression circuit 52 and the output voltage regulation circuit 53. Thereby, the proposed ripple voltage suppression method of the invention can not only suppress the ripple voltage that could be transmitted to the DC input voltage source 1 through the DC/DC converter 2, but also provides a simplified control circuit without said additional current detector. Therefore, cost for manufacture of the power conversion system is lowered while the life and energy storage efficiency of the buffer 3 is increased.

Although the invention has been described in detail with reference to its presently preferred embodiment, it will be understood by one of ordinary skill in the art that various modifications can be made without departing from the spirit and the scope of the invention, as set forth in the appended claims.

What is claimed is:
1. A ripple voltage suppression apparatus, comprising:
   a DC/DC converter having a power electronic switch; and
   a control circuit having a voltage detector to detect a DC output voltage of the DC/DC power converter, a ripple voltage suppression circuit receiving the detected DC output voltage to generate an AC control signal for controlling an AC component of a duty ratio of the power electronic switch, an output voltage regulation circuit receiving the detected DC output voltage to generate a DC control signal for controlling an DC component of the duty ratio, an adder adding the AC and DC control signals to form a united control signal, and a PWM circuit converting the united control signal into a PWM signal to control the power electronic switch;

wherein only the DC output voltage of the DC/DC converter has to be detected to function the control circuit.

2. The ripple voltage suppression apparatus as defined in claim 1, wherein the DC/DC converter further has an inductor and a diode, with the inductor and the diode electrically connecting with each other in series and being connected between an output terminal and an input terminal of the DC/DC converter, wherein the power electronic switch has two end points, with one of the end points connecting with a joint point between the inductor and the diode and the other connecting with another output terminal and another input terminal of the DC/DC converter.

3. The ripple voltage suppression apparatus as defined in claim 1 wherein the ripple voltage suppression circuit further comprising a band-pass filter having an input connecting with the voltage detector, a divider having two inputs separately linking to outputs of the voltage detector and the band-pass filter, a first subtractor having two inputs connect to an unit signal source and an output of the output voltage regulation circuit respectively, and a multiplier having two inputs separately connecting with outputs of the divider and the first subtractor and outputting the AC control signal.

4. The ripple voltage suppression apparatus as defined in claim 1, wherein the output voltage regulation circuit further comprises a second subtractor having two inputs separately linking to the outputs of the voltage detector and the band-pass filter, a third subtractor having two inputs connecting with the output of the second subtractor and a predetermined voltage source respectively, and a PI controller connecting with an output of the third subtractor to output the DC control signal.

5. The ripple voltage suppression apparatus as defined in claim 4, wherein the predetermined voltage source generates a predetermined voltage as a desired voltage for an average output voltage of the DC/DC converter to track.

6. The ripple voltage suppression apparatus as defined in claim 1, wherein an energy buffer connects with an output side of the DC/DC converter, with the energy buffer being selected from a DC capacitor or a storage battery.

7. A ripple voltage suppression method for controlling a power electronic switch of a DC/DC converter by a control circuit, comprising:

receiving an output voltage of the DC/DC converter by a voltage detector;

inputting the detected output voltage of the DC/DC converter to the control circuit;

generating an AC control signal and a DC control signal respectively by a ripple voltage suppression circuit and an output voltage regulation circuit of the control circuit, with the AC control signal being used to control an AC component of a duty ratio of the power electronic switch and the DC control signal being used to control a DC component of the duty ratio of the power electronic switch;

adding the AC control signal and the DC control signal to form a united control signal and then inputting the united control signal into a PWM circuit to obtain a PWM signal; and sending the PWM signal to the power electronic switch for controlling the power electronic switch.

8. The ripple voltage suppression method as defined in claim 7, wherein the DC/DC converter is initially selected from a combination of a inductor, a diode and the power electronic switch, with the inductor and the diode electrically connecting with each other in series and being connected between an output terminal and an input terminal of the DC/DC converter, wherein the power electronic switch has two end points, with one of the end points connecting with a joint point between the inductor and the diode and the other connecting with another output terminal and another input terminal of the DC/DC converter.

9. The ripple voltage suppression method as defined in claim 7, wherein the ripple voltage suppression circuit generates the AC control signal by sending the detected DC output voltage of the DC/DC converter to a band-pass filter; dividing an output of the band-pass filter by the detected DC output voltage of the DC/DC converter by a divider; subtracting the DC control signal from a DC unit signal by a first subtractor; and multiplying outputs of the divider and the first subtractor to obtain the AC control signal.

10. The ripple voltage suppression method as defined in claim 7, wherein the output voltage regulation circuit generates the DC control signal by subtracting the output of the band-pass filter from the detected DC output voltage of the DC/DC converter by a second subtractor; subtracting an output of the second subtractor from a predetermined voltage by a third subtractor to generate an error signal; transmitting the error signal to a PI controller to generate the DC control signal.

11. The ripple voltage suppression method as defined in claim 10, wherein the predetermined voltage is a desired voltage for an average output voltage of the DC/DC converter to track.

* * * * *